Figure 1:
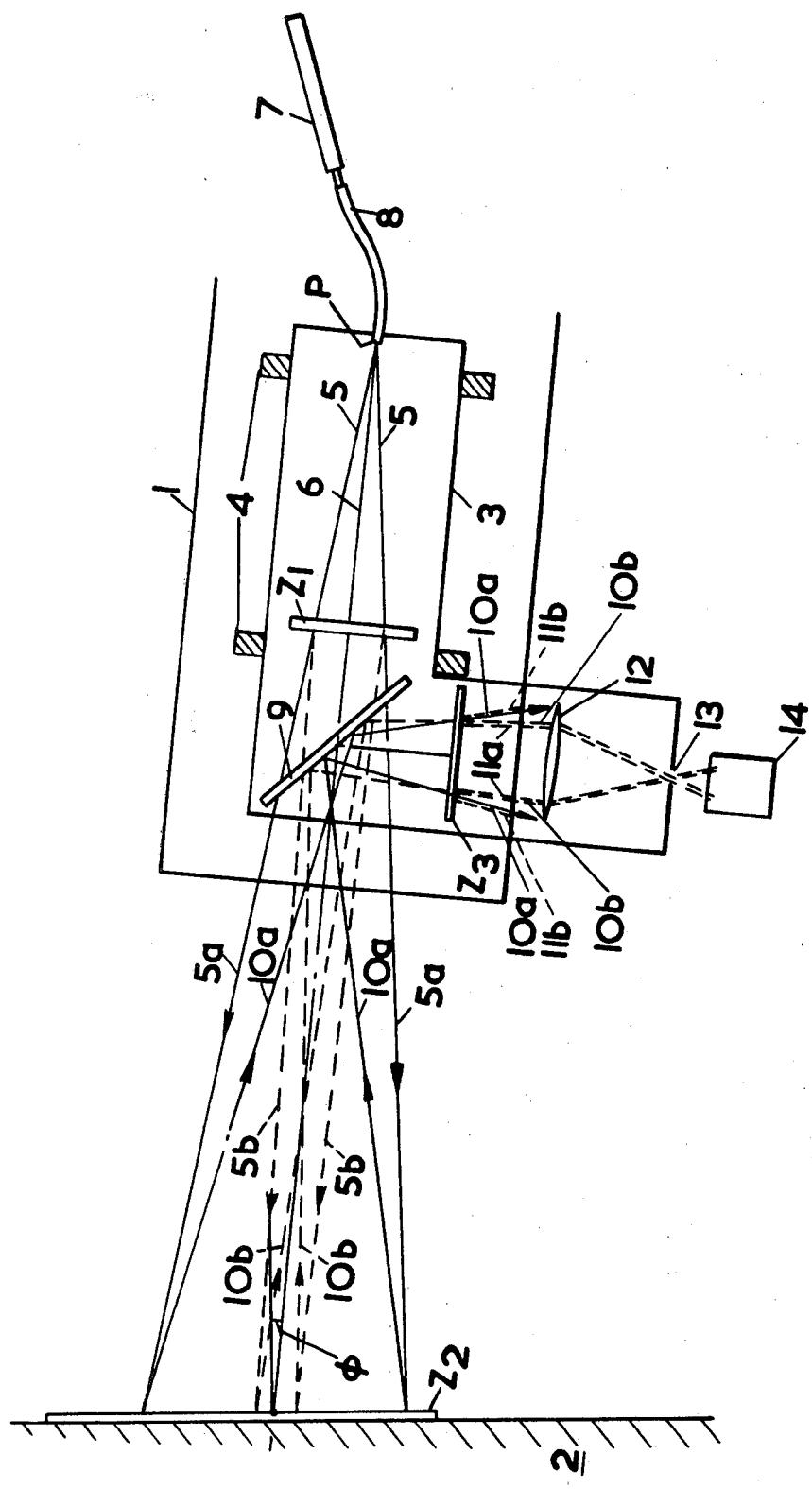

United States Patent [19]

Gates et al.

[11] 4,113,388
[45] Sep. 12, 1978

[54] OPTICAL APPARATUS FOR DETERMINING RELATIVE POSITIONING OF TWO MEMBERS

[75] Inventors: John William Charles Gates, East Molesey; Roy Geoffrey Noel Hall, Teddington; Ian Norman Ross, Marcham; Richard Frederick Stevens, Ashford, all of England

[73] Assignee: National Research Development Corporation, London, England

[21] Appl. No.: 700,037

[22] Filed: Jun. 25, 1976

[51] Int. Cl.$^2$ .................. G01B 9/02; G01B 11/04
[52] U.S. Cl. .................. 356/110; 356/111; 356/169; 250/237 G
[58] Field of Search .............. 356/110, 111, 169, 172; 250/237 G; 350/162 ZP

[56] References Cited

U.S. PATENT DOCUMENTS 4,037,969   7/1977   Feldman .................. 350/162 ZP Primary Examiner—Conrad J. Clark
Attorney, Agent, or Firm—Cushman, Darby & Cushman

[57] ABSTRACT

Optical apparatus for monitoring the relative positioning of first and second members which are movable relative to each other includes radiation means for generating an optical wavefield which provides, over a given area which has a predetermined location relative to the first member at least when the first member is in a given position relative to the second member, a distinctive light intensity distribution. The distinctive light intensity distribution results from at least two wavefronts that differ from each other in curvature in each of two mutually orthogonal planes. The radiation means preferably includes a source of radiation, a diffracting element and a focussing element. The diffracting element coacts with the source of radiation to provide said at least two wavefronts and the focussing element produces an image of the diffracting element at said predetermined location at least when the first member is in said given position relative to the second member. The apparatus also includes fiducial means for interacting with the wavefield when the first member is in the vicinity of said given position to produce an interference pattern whose form is indicative of the displacement of the first member from said given position. The fiducial means includes an optical element which may be a photographic recording processed to be a negative image of said distinctive light intensity distribution.

13 Claims, 7 Drawing Figures

OPTICAL APPARATUS FOR DETERMINING RELATIVE POSITIONING OF TWO MEMBERS

This invention relates to optical apparatus, and, in particular, to optical apparatus which can monitor the relative positioning of two members which are movable relative to each other.

In production engineering, for example, increasing use is made of specialised machine tools and measuring equipment in which the essential dimensions are derived from measurements of the position in space in terms of Cartesian co-ordinates of a number of points on a testpiece. Usually, calibration is achieved by bringing a probe successively into contact with the points at which measurement is required and into contact with datum surfaces. Automatic read-out of the co-ordinates may be provided as a numerical display.

Hitherto, methods of calibrating a large number of points within a working volume have involved considerable time and effort, primarily because of the need to set up and reposition a large number of auxiliary tools and fittings to evaluate all the necessary functions, and frequently the need to interchange probes or to re-jig the calibration device between the calibration of points has introduced substantial inaccuracies into the calibration.

The present invention seeks to provide an optical apparatus which can be used for calibration and/or measurement of a large number of points within a working volume with greater speed than with previously known devices.

According to the present invention there is provided an optical apparatus for monitoring the relative positioning of first and second members which are movable relative to each other, the apparatus comprising radiation means for generating an optical wavefield which provides, over a given area which has a predetermined location relative to the first member at least when the first member is in a given position relative to the second member, a distinctive light intensity distribution resulting from at least two wavefronts that differ from each other in curvature in each of two mutually orthogonal planes; and fiducial means for interacting with the wavefield when the first member is in the vicinity of said given position to produce an interference pattern whose form is indicative of the displacement of the first member from said given position, the fiducial means comprising an optical element which is fixed relative to the second member in a location which coincides with said predetermined location when the first member is in said given position relative to the second member, the optical element having a structure representative of the light intensity distribution in the wavefield over at least one area which at least approximately corresponds in position to a least part of said given area.

The radiation means may comprise a source of radiation and a diffracting element.

The diffracting element may be a simple ground glass screen which scatters a portion of the radiation incident upon it and permits a portion of the incident radiation to be transmitted unscattered. Alternatively the diffracting element may be a scatter plate, a Fresnel zone plate or a holographic lens but preferably the diffracting element is formed by an interference process such as holography and is one which diffracts the incident radiation into one or more distinct wavefronts as well as allowing part of the incident radiation to be undiffracted, hereinafter referred to as zone plates. Any two of these wavefronts or any one of them and the undiffracted radiation, may be employed to form the distinctive light intensity distribution. The "zone plates" may operate so that they primarily transmit the incident radiation (i.e. transmissive 'zone plates') or so that they primarily reflect the incident radiation (i.e. reflective 'zone plates').

The radiation means may incorporate focussing means arranged to produce an image of the diffracting element at the predetermined location at least when the first member is in said given position relative to the second member. The focussing means may be incorporated in a 'zone plate' (either reflective or transmissive) or it may be a lens, mirror or a combination of these.

In important embodiments of the invention, the apparatus is capable of monitoring the relative positioning of the first and second members when one member is in the vicinity of any of a plurality of given positions relative to the other. In these embodiments the radiation means is arranged to generate a series of similar wavefields each one of which is generated when the first member is in a corresponding one of a series of different given positions relative to the second member. The similar wavefields are respectively disposed relative to the first member so that when the first member is in one of said series of given positions relative to the second member the location of said optical element will coincide with said predetermined location in respect of the corresponding wavefield. To produce the series of wavefields the second member may have fixed relative to it a source of radiation and a diffracting element; and a series of focussing means e.g. reflective 'zone plates' may be provided fixed in different positions relative to the first member. The series of focussing means may be arranged in a two dimensional array.

The fiducial means may comprise a plurality of optical elements positioned relative to the second member at discrete, coincident, or overlapping locations.

In order that the optical element may be capable, when positioned in close proximity to the predetermined location, of operating on the wavefield to produce the interference pattern, it may be either a photographic recording, or a replica of the surface relief from a photographic or photomechanical recording, of the light intensity distribution over said given area. Alternatively, it may comprise two recordings, or replicas of the surface relief from recordings, respectively of the light intensity distribution in the wavefield over two areas respectively situated at equal distances in opposite directions from two corresponding parts of said given areas.

The optical element may be a normal photographic recording of the intensity distribution so that the interference pattern provides amplitude information, alternatively it may be a partially or totally bleached photographic recording so that the interference pattern provides respectively both amplitude and phase information or only phase information.

An interference pattern containing amplitude information may be monitored, for example, by integrating the intensity over a field of observation and feeding the integrated signal to a photo detector. In particular, if the optical element is a photographic recording of the light intensity distribution of the distinctive wavefield and is processed to be a negative image of the intensity distribution, when the optical element is in coincidence with the predetermined location the photo detector will detect a minimum. When the optical element comprises two photographic recordings the interference pattern may be monitored by two photo detectors which will detect a balance position when the optical element is at the predetermined location and is thus midway between the position corresponding to the coincidence of each recording with the wavefield. The interference pattern may also be monitored by viewing on a TV monitor.

The apparatus is suitable for application to the calibration of high precision machine tools and measuring equipment. Either the first or the second member may be a stationary part of the machine — eg the quill housing of a vertical milling machine and the second or first member may be respectively a movable part of the machine — eg the milling machine table. In such an application for example, the radiation means may comprise a source, a diffracting element and a two dimensional array of reflecting elements. The source, the diffracting element and the optical element are rigidly attached to the fixed part of the machine and the two dimensional array of reflecting elements is rigidly attached to the movable part of the machine. The plurality of reflecting elements making up the array are arranged at predetermined spatial intervals. Each reflecting element is preferably used as a multiple focussing element and provides a distinctive light intensity distribution at one of a plurality of predetermined locations from the reflecting elements when the movable part of the machine is in a corresponding given position relative to the fixed part so that a three dimensional array of locations is provided. These locations can be arranged as required by controlling the fabrication and distribution of the elements.

Figure 2A:
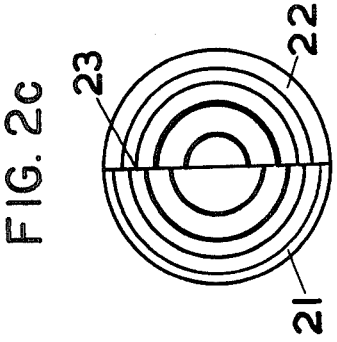
Figure 2B:
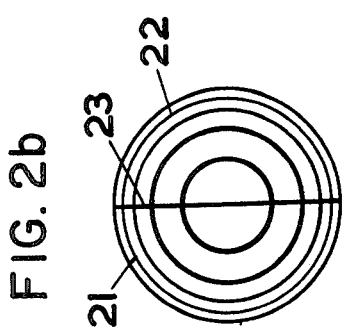
Figure 2C:
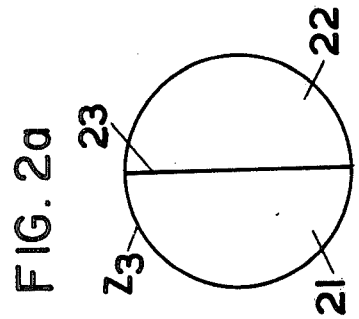
Figure 5:
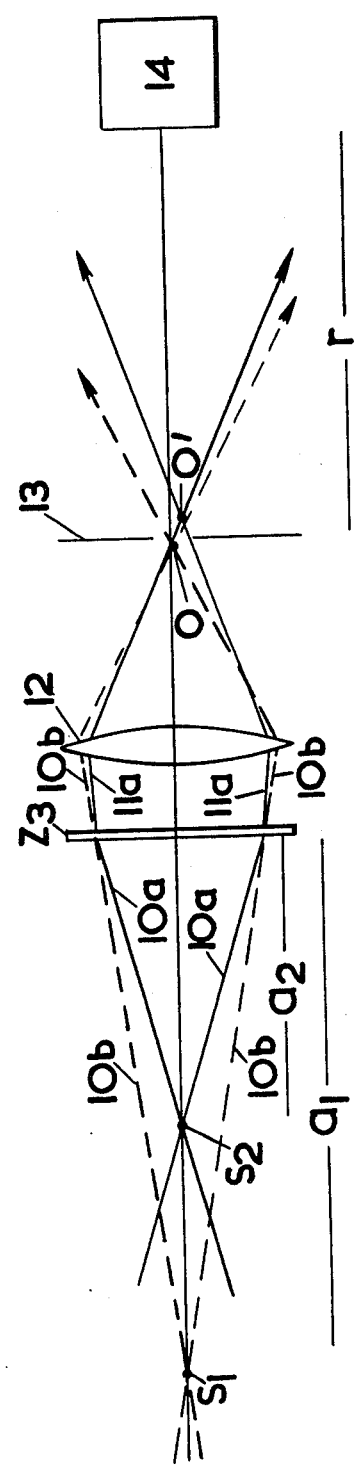
Figure 3:
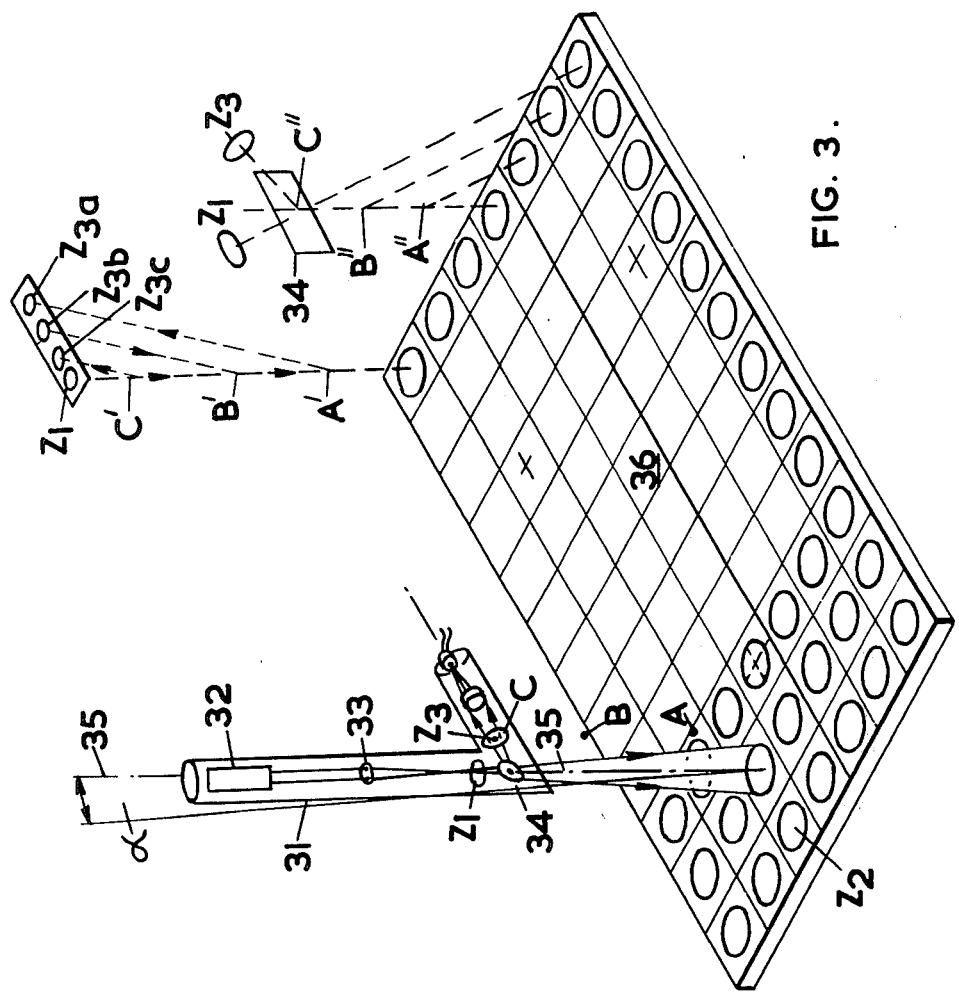

The invention will now be further described, by way of example only, with reference to the accompanying figures:

FIG. 1 is a schematic illustration of a particular embodiment of of the invention, FIG. 2a illustrates one embodiment of an optical element, FIGS. 2b and 2c illustrate interference patterns produced by the element of FIG. 2a, FIG. 3 illustrates a calibration system which incorporates one embodiment of the invention and is for use in calibrating a precision measuring machine, FIG. 4 illustrates some typical interference patterns produced by apparatus constructed in accordance with the invention, FIG. 5 shows a portion of the embodiment of FIG. 1.

Referring to FIG. 1, a movable machine member 2 is positioned with respect to a fixed machine head 1 in a location which can be defined with respect to a given system of co-ordinates. An optical assembly 3, rigidly attached to the machine head 1 by clamps 4, comprises an effective source P of coherent light which projects a diverging beam of light indicated by rays 5, centred about an axis 6, towards the movable member 2. Coherent light may for example be provided at the source P by a combination of a helium-neon laser 7 and a fibre optic bundle 8.

The beam 5 is arranged to be incident on a 'zone plate' $Z_1$ which divides the beam into a transmitted beam 5a and a first order diffracted beam 5b which are incident on a beam splitter 9. The beam splitter 9 allows a portion of both the transmitted beam 5a and the first order diffracted beam 5b to pass through and be incident on a reflecting 'zone-plate' $Z_2$ which is rigidly attached to the movable member 2. The beam axis 6 is offset from the normal to the zone plate $Z_2$ by an angle $\phi$ to reject the mirror reflections of the transmitted beam 5a and the first order diffracted beam 5b. The 'zone plate' $Z_2$ acts in the same order of diffraction to reflect beams 10a and 10b, corresponding respectively to the transmitted beam 5a and the diffracted beam 5b, back towards the beam splitter 9. The beam splitter 9 reflects a portion of both diffracted beams 10a and 10b to be incident on an optical element The 'zone plate' $Z_1$ and the reflecting 'zone plate' $Z_2$ are arranged so that when the movable member 2 is in the given position relative to the machine head 1 a one-to-one image of 'zone plate' $Z_1$ is formed upon the optical element $Z_3$. The optical element $Z_3$ is made in situ from a high resolution photographic plate exposed to record the distinctive light intensity distribution resulting from the two wavefronts of the beams 10a and 10b. Each of these beams has a spherical wavefront which has a different radius of curvature from the other. The photographic plate is processed to be a negative matching copy of the distinctive light intensity distribution. (The recording of the optical element $Z_3$ is made by replacing fibre optic bundle 8 and the source P by a lens (not shown) to give a point source at P, since this maximises the light available and increases the efficiency of the optical element $Z_3$.)

If the movable member 2 is subsequently moved relative to the machine head 1, it can be accurately repositioned in its original location by bringing the image of the 'zone-plate' $Z_1$ back into coincidence with the element $Z_3$. When the image of the 'zone-plate' $Z_1$ is approximately co-incident with the element $Z_3$, the beam 10a and 10b are incident on $Z_3$ to produce further diffracted beams respectively 11a (first order of diffraction of beam 10a) and 11b (first order of diffraction of beam 10b); which cooperates with the transmitted portions of the beams 10b and 10a respectively to give an interference pattern.

A lens 12 and pinhole 13 are located to select with improved signal-to-noise ratio only the beams 10b and 11a, and a detector 14 placed behind the pinhole 13, registers a reading corresponding to the integration of the intensity over the interference pattern, produced by the beams 10b, 11a. Departure of the image of the 'zone-plate' $Z_1$ from coincidence with the element $Z_3$ will give either circular or straight interference fringes depending on whether the departure includes displacement normal or purely in the plans of the element $Z_3$. When the image of the 'zone-plate' $Z_1$ is coincident with the element $Z_3$, the interference between the beams 10b and 11a gives a uniformly dark field, corresponding to a minimum reading on the detector 14.

The precision of position setting of the movable member 2 with respect to the machine head 1 is determined by the rate at which the phase difference between the beams 10b and 11a increases with the displacement of the 'zone-plate' $Z_2$ and the phase difference which gives the minimum change in the integrated signal which is detectable by the detector 14.

If the minimum detectable phase difference is $\epsilon$ and the semi-angle subtended by the reflecting 'zone-plate' $Z_2$ at the centre of curvature of its principal autostigmatic reflected wavefront is $\theta$ :

The minimum detectable displacement of $Z_2$ in a direction in the plane of the element $Z_3$ equals $(\epsilon/2\pi) \cdot (1/2\theta)$ wavelengths.

The minimum detectable displacement of $Z_2$ in the direction of the normal to the element $Z_3$ equals $(\epsilon/2\pi) \cdot (1/\theta^2)$ wavelengths.

If $(\epsilon/2\pi) = 1/5$ fringe shift can be detected by the detector 14, and a Helium-Neon laser having a wavelength of 0.633 μm is used, the minimum aperture required by the zone-plate $Z_2$ to give a required accuracy of position setting of plus or minus 1 μm will be 0.5 radians for the setting normal to the element $Z_3$ and 0.12 radians for the transverse setting in the plane of the element $Z_3$.

If the interference pattern formed by the beams 10b and 11a is monitored by a TV camera tube (not shown), the detection of a change in position producing much less than one fifth of a fringe shift is possible. In this case, the optimum sensitivity is obtained when the phases of the beams 10b and 11a are in quadrature (achieved for example by using a partially bleached element $Z_3$), and the signal then changes by 6% for 1/100 fringe shift. A fluctuation of signal of this magnitude across the aperture scanned can be easily detected in the output of the camera and can be displayed on an oscilloscope, or the a.c. component can be extracted and displayed on a meter.

An alternative form of the element $Z_3$ is shown in FIG. 2(a) in which 2 separate exposures 21 and 22 are made on adjacent parts of the element $Z_3$, divided by a dividing line 23. Between the exposures the movable member 2 and hence the reflecting 'zone-plate' $Z_2$, is moved through a small distance so that the light intensity distribution in the wavefield is moved relative to and normal to the element $Z_3$. Position setting is achieved when the reflecting 'zone-plate' $Z_2$ is at a position accurately mid-way between the exposure positions. In this position, each half of the interference pattern formed by the beams 10b and 11a shows, as in FIG. 2(b), identical interference fringe patterns, which match at the dividing line 23 between the exposures 21 and 22 due to equal and opposite displacements of the image of the 'zone-plate' $Z_1$ with respect to the 2 exposures 21 and 22 of the element $Z_3$. Departure from this position is characterised by an interference pattern similar to that shown in FIG. 2(c).

Referring to FIG. 3, an optical system 31 comprising a laser 32, a lens 33, a 'zone-plate' $Z_1$ and beam splitter 34 is arranged to project two wavefronts along a beam axis 35 towards one of the two-dimensional array of identical reflecting 'zone-plates' $Z_2$, the beam axis 35 being inclined at a small angle (shown exaggerated) to the normal to the array 36. Each 'zone-plate' $Z_2$ is capable of co-operating with the optical system 31 to produce a one-to-one image of the 'zone-plate' $Z_1$ at one of three predetermined positions A, B and C above the array 36 when the optical system 31 is in a corresponding position relative to the array 36. The optical system 31 also incorporates an element $Z_3$ which is a recording of the one-to-one image of the 'zone-plate' $Z_1$ and movement can be provided between the optical system, mounted on a fixed part (not shown) of a measuring machine, and the array 36, mounted on a movable part (not shown) of the machine, to bring the 'zone-plate' $Z_3$ successively into coincidence with the one-to-one images of the 'zone-plate' $Z_1$ at the points A, B and C. The three positions of the array can be defined in terms of the co-ordinate system of the machine and the co-ordinates checked against the predetermined spacings of the points A, B and C for each 'zone-plate' $Z_2$. The co-ordinates of the machine in two transverse directions can be checked in a similar manner against the known spacing of the 'zone-plates' $Z_2$ in the array 36. The 'zone-plates' $Z_2$ are preferably mounted on a base made of material of very low coefficient of thermal expansion — eg Silica, Zerodur or Cer Vit.

Alternatively the beam axis 35 may be made normal to the array 36 and three elements $Z_{3a}$, $Z_{3b}$, and $Z_{3c}$ can be incorporated off axis in the optical system, in positions wherein they can be brought into coincidence with the one-to-one images of the 'zone-plate' $Z_1$ when $Z_2$ is located at the points A, B and C respectively.

Another alternative configuration is shown in FIG. 3 with the beam splitter 34 perpendicular to the array 36. The one-to-one images of the 'zone plate' $Z_1$ can be brought into coincidence with the element $Z_3$ by moving the array 36 so that the beam reflected by the 'zone-plates' $Z_2$ strikes the beam splitter 34 at A, B or C.

Figure 4C:
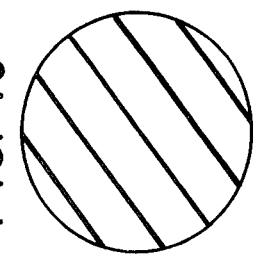
Figure 4G:
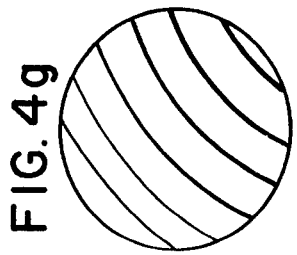
Figure 4B:
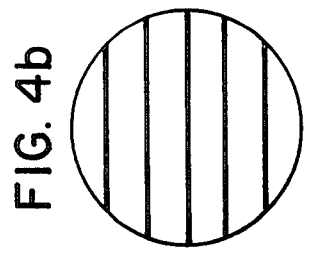
Figure 4F:
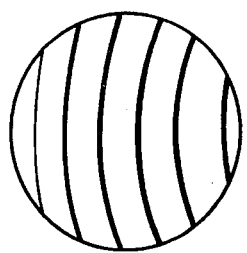
Figure 4A:
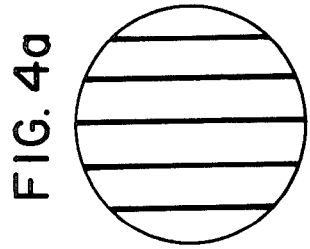
Figure 4E:
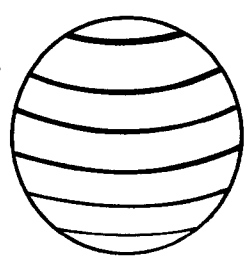
Figure 4D:
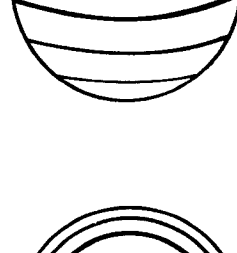

In all embodiments of this invention if the optical element of the fiducial means is a photographic recording or a replica of the surface relief from a photographic or photomechanical recording of the light intensity distribution over said given area the interference pattern may be scanned electronically to determine the displacement of the optical element from the predetermined location and hence the displacement of the first member from the given position relative to the second member. This may be achieved by employing for example a video camera tube or a self-scanned two dimensional photo-diode array and the appropriate electronics to interrogate the camera tube or photo-diode array. The form of the interference pattern is indicative of the displacement of the first member from the given position and FIG. 4 shows typical interference patterns that are obtained with apparatus in accordance with this invention. FIGS. 4a, 4b and 4c show respectively the patterns obtained when the displacement of the distinctive light intensity distribution is in the plane of the optical element $Z_3$ (FIG. 4a) in one direction, or in the direction orthogonal to that direction (FIG. 4b) or in both these directions (FIG. 4c). FIG. 4d shows the pattern obtained when the displacement is normal to the optical element and FIGS. 4e, f and g show the patterns obtained when the displacements of FIGS. 4a, 4b and 4c respectively are combined with the displacement of FIG. 4d. The displacement of the distinctive light intensity distribution relative to the optical element is proportional to the displacement of the first member from the given position. The constant of proportionality will depend firstly upon whether it is the diffracting, focusing (if used) or optical element which is displaced relative to the others, secondly upon the diffraction orders selected at each element, thirdly upon the wavelength of the radiation employed and lastly upon the curvatures of the wavefronts that cooperate to form the distinctive light intensity distribution.

FIG. 5 shows a portion of the apparatus of FIG. 1. The beam splitter 9 has been omitted for clarity and the detector 14 can be considered to be a two-dimensional array of photo-diodes. The optical element $Z_3$ operates upon the incident beam 10a to provide a first order diffracted beam 11a which coincides in direction with the transmitted undiffracted portion of beam 10b if the members are in the given position relative to each other. FIG. 5 however shows the situation when the members are relatively displaced by a small amount, represented by cartesion coordinates $dx$, $dy$ and $dz$ (where the z axis is coincident with the beam axis 6) from the given position. The virtual sources of beams 10b and 11a are shown as $S_1$ and $S_2$, respectively, which are at distances $a_1$ and $a_2$ respectively from the optical element $Z_3$. Points $S_1$ and $S_2$ are imaged by the lens 12 in the vicinity of the pinhole 13 as O and $O^1$ respectively which have a displacement from each other which can be represented by the cartesian coordinates $l$, $m$ and $n$ (where the $n$ axis is coincident with the normal to the element $Z_3$).

The displacement of the members causes $S_1$ to be displaced by $2dx$, $2dy$ and $2dz$ because of the use of a reflective 'zone plate' $Z_2$. $S_2$ is displaced from the position of $S_1$ when the members are in the given position by $2g_1 dx$, $2g_1 dy$ and $2g_1^2 dx$ where $g_1$ is the magnification ratio for the transverse imaging of the first order of diffraction by $Z_3$ and is equal to the ratio $a_1/a_2$. The separation of $S_1$ and $S_2$ is $2g_1 dx - 2dx$, $2g_1 dy - 2dy$ and $2g_1^2 dz - 2dz$. If the transverse magnification of lens 12 is $g_2$ then it can be shown that $l = 2g_2(g_1 - 1) dx$, $m = 2g_2(g_1 - 1) dy$ and $n = 2g_2^2(g_1^2 - 1)dz$. If the interference pattern is scanned to determine the light intensities in two mutually orthogonal directions then the light intensity in those directions at intervals of '$p$' may be interpolated and the above expressions can be rewritten $$l = -1/\gamma \, \overline{\Delta W}x$$

$$m = -1/\gamma \, \overline{\Delta W}y$$

$$n = 1/\gamma^2 (\overline{\Delta^2 W}x + \overline{\Delta^2 W}y)/2$$

where $\gamma = p/r$ and $\overline{\Delta W}x$ is the mean of the path differences at successive points spaced $p$ apart in the direction of the $x$ axis; similarly for $\overline{\Delta W}y$. $\overline{\Delta^2 W}x$ is the mean of successive values of $\overline{\Delta W}x$ in the direction of the $x$ axis; similarly for $\overline{\Delta^2 W}y$. If follows that $$dx = -\frac{\overline{\Delta W}_x}{2g_2(g_1 - 1)\gamma} \quad dy = \frac{\overline{\Delta W}_y}{2g_2(g_1 - 1)\gamma}$$

$$dz = \frac{\overline{\Delta^2 W}_x + \overline{\Delta^2 W}_y}{4g_2^2(g_1^2 - 1)\gamma^2}$$

and hence the displacement of the first member from its given position relative to the second member may be measured. By way of example only typical parameters of am embodiment according to this invention are:

$g_1 = 3$, $g_2 = 0.3$, $\gamma = 0.1$ for measurement of $dx$, $dy$ to 1 $\mu$m$\Delta W$ has to be measured to 0.12 $\mu$m, and for measurement of $dz$ to 1 $\mu$m $\Delta^2 W$ has to be measured to 0.014 $\mu$m.

It will be appreciated that the maximum displacement from the given position which can be sensed in any given case will depend on the geometry of the optical system employed. It is envisaged that in embodiments of the invention, such as that illustrated in FIG. 3, in which displacements from any of a series of given positions can be sensed the spacing of these positions can be so arranged relative to the maximum displacement which can be sensed that it is possible to provide for substantially continuous monitoring in at least two dimensions of the relative positioning of the two members.

What we claim is:

1. An optical apparatus for monitoring the relative positioning of first and second members which are movable relative to each other, the apparatus comprising radiation means for generating an optical wavefield which provides, over a given area which has a predetermined location relative to the first member when the first member is in a given position relative to the second member, a distinctive light intensity distribution resulting from at least two wavefronts that differ from each other in curvature in each of two mutually orthogonal planes; and fiducial means for interacting with the wavefield when the first member is in the vicinity of said given position to produce an interference pattern whose form is indicative of the displacement of the first member from said given position, the fiducial means comprising an optical element which is fixed relative to the second member in a location which coincides with said predetermined location when the first member is in said given position relative to the second member, the optical element having a structure representative of the light intensity distribution in the wavefield over at least one area which at least approximately corresponds in position to a least part of said given area.

2. An optical apparatus according to claim 1, in which the radiation means comprises a source of radiation and a diffracting element which operates upon radiation from the source so that part of the radiation is diffracted, said at least two wavefronts being derived from the radiation with at least one wavefront being derived from the diffracted part of the radiation.

3. An optircal apparatus according to claim 2 in which the diffracting element is a diffracting element defining a zone plate.

4. An optical apparatus according to claim 2 in which the radiation means further comprises focussing means for producing an image of the diffracting element at said predetermined location at least when the first member is in said given position relative to the second member.

5. An optical apparatus according to claim 4 in which the focussing means includes a diffracting element defining a zone plate.

6. An optical apparatus according to claim 4 in which the source of radiation and the diffracting element are fixed relative to the second member and the focussing means is fixed relative to the first member.

7. An optical apparatus according to claim 1 in which said wavefield is one of a series of similar wavefields each of which is generated by the radiation means when the first member is in a corresponding one of a series of different given positions relative to the second member, the similar wavefields being respectively disposed relative to the first member so that when the first member is in one of said series of positions relative to the second member the location of said optical element will coincide with said predetermined location in respect of the corresponding wavefield.

8. An optical apparatus according to claim 6 in which said wavefield is one of a series of similar wavefields each of which is generated by the radiation means when the first member is in a corresponding one of a series of different given positions relative to the second member, the similar wavefields being respectively disposed relative to the first member so that when the first member is in one of said series of positions relative to the second member the location of said optical element will coincide with said predetermined location in respect of the corresponding wavefield, and wherein the radiation means comprises a series of focussing means respectively corresponding to said series of wavefields and fixed in different positions relative to the first member.

9. An optical apparatus according to claim 8, in which the series of focussing means is arranged in a two-dimensional array.

10. An optical apparatus to claim 1, in which said optical element has a structure representative of said distinctive light intensity distribution.

11. An optical apparatus according to claim 1 in which said optical element has a structure which over two parts of the element is respectively representative of the light intensity distribution in the wavefield over two areas respectively situated at equal distances in opposite directions from two corresponding parts of said given area.

12. An optical apparatus according to claim 1, in which said optical element is a photographic recording processed to be a negative image of the relevant light intensity distribution.

13. An optical apparatus according to claim 1 in which the fiducial means comprises a plurality of optical elements fixed relative to the second member in different locations.

* * * * *